J. W. BRADLEY.
Flour Bolt.

No. 105,034.

Patented July 5, 1870.

Witnesses:
H. A. Daniels
J. W. Hester

Inventor:
J. W. Bradley
by
Chas. S. Whitman
atty

United States Patent Office.

JOSEPH WASHINGTON BRADLY, OF ROCHEPORT, MISSOURI.

Letters Patent No. 105,034, dated July 5, 1870.

IMPROVED FLOUR-BOLT KNOCKER.

The Schedule referred to in these Letters Patent and making part of the same.

*To all whom it may concern:*

Be it known that I, JOSEPH WASHINGTON BRADLY, of Rocheport, in the county of Boone and in the State of Missouri, have invented a new and useful Improvement in Flour-bolting Machines; and do hereby declare that the following description, taken in connection with the accompanying drawing hereinafter referred to, forms a full and exact specification of the same, wherein I have set forth the nature and principles of my said improvement, by which my invention may be distinguished from others of a similar class, together with such parts as I claim and desire to secure by Letters Patent.

My invention relates to devices made use of for bolting flour, and

Its nature consists in certain modifications in the details of the same, whereby the knockers are arranged on the outside of the reel, by means of a hinge and wires of a curvilinear form, and are provided with adjustable weights for regulating their stroke, and buttons for securing them in position.

In the accompanying drawing, which illustrates my invention and forms a part of the specification thereof, and in which corresponding parts are illustrated by similar letters—

Figure 1:
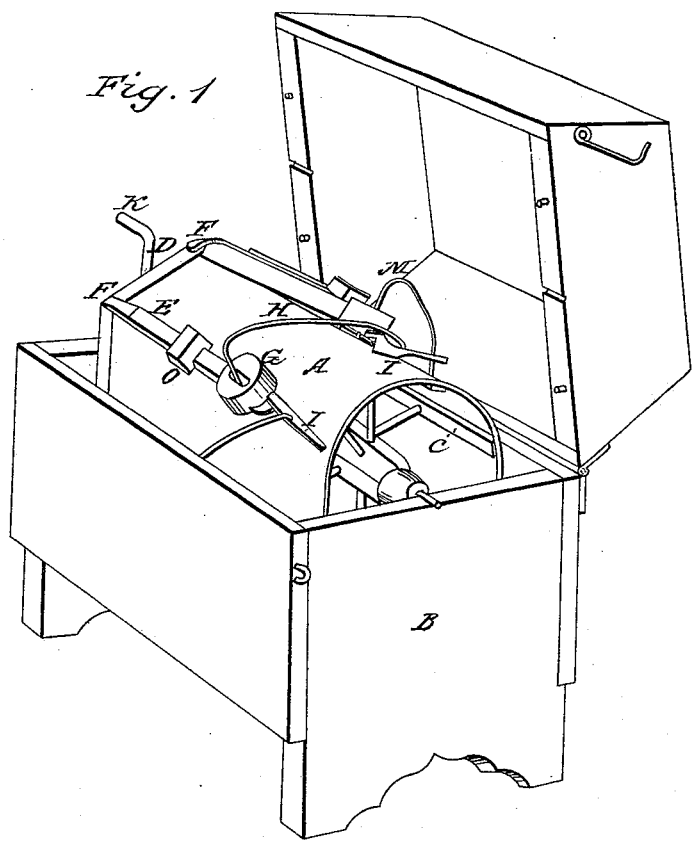
Figure 2:
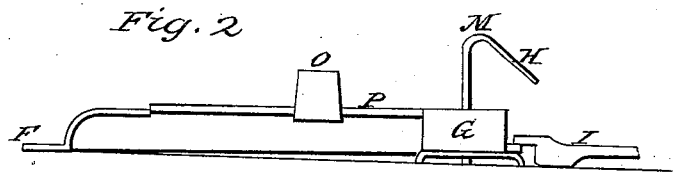

Figure 1 is a perspective view of a reel, with my invention applied thereto, and Figure 2 represents a detached view of one of the knockers.

The construction, operation, and relative arrangement of the component parts constituting my invention are as follows, to wit:

A represents a reel, covered with cloth of a suitable texture, and revolving upon a shaft, which has its bearings in the chest B.

The said reel is provided with ribs, c, which are connected with the shaft by means of spokes, and the ends of which are secured to the hexagonal end D of the reel A.

Upon the outer periphery of the said reel are the knockers E, which are connected with one end of the same by the hinges F, in such a manner as to allow them to vibrate up and down.

The hammers, attached to the ends of the said knockers, are provided with slots or perforations, through which passes the curvilinear wire H.

Those portions of the said wire which pass through the said slots are perpendicular to the ribs c, and attached thereto. The other end of the said wire passes through perforations cut in the buttons I, in such a manner as to allow them to revolve thereon.

In revolving the reel, by means of the crank k, the force of gravity causes the hammers, when they rise to the top upon their respective wires, to fall upon the reel, giving the same a smart tap, and knocking the flour from the inner surface thereof.

When, in the course of rotation, they reach the under side of the reel, they fall back against the bend M of the wire, and cause, by the percussion of the stroke, the flour within the reel to be sifted through the cloth.

The hammers G are locked in position against the external periphery of the reel by means of the buttons I, and the force of the stroke of said hammer is regulated by the weights o, which slide upon ways, P, attached to the back of the knockers, in such a manner that they may be adjusted in any position upon the same.

Having thus described the construction and operation of my invention, I will indicate what I claim and desire to secure by Letters Patent in the following clauses:

1. The weights o, sliding upon ways P upon the back of the knockers, when arranged to operate as described.

2. The knockers, provided with the hinges F and slotted hammer G, in combination with the wire H and button I, all constructed, arranged, and operating as described.

In testimony that I claim the foregoing, I have hereunto set my hand this 25th day of September, 1869.

J. W. BRADLY.

Witnesses:
    JOHN F. BRADLY,
    ESQUIRE BRADLY.